United States Patent
Moskowitz et al.

(10) Patent No.: US 12,260,967 B2
(45) Date of Patent: *Mar. 25, 2025

(54) MODULAR, INTEGRATED, AUTOMATED, COMPACT, AND PROLIFERATION-HARDENED METHOD TO CHEMICALLY RECYCLE USED NUCLEAR FUEL (UNF) ORIGINATING FROM NUCLEAR REACTORS TO RECOVER A MIXTURE OF TRANSURANIC (TRU) ELEMENTS FOR ADVANCED REACTOR FUEL TO RECYCLE URANIUM AND ZIRCONIUM

(71) Applicant: CURIO SOLUTIONS LLC, Inwood, NY (US)

(72) Inventors: Yechezkel Moskowitz, Far Rockaway, NY (US); Yehudah Moskowitz, Far Rockaway, NY (US); Vik Singh, Arlington, VA (US)

(73) Assignee: CURIO SOLUTIONS LLC, Inwood, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,875

(22) Filed: Jul. 6, 2023

(65) Prior Publication Data

US 2023/0360813 A1 Nov. 9, 2023

Related U.S. Application Data

(63) Continuation of application No. 17/591,167, filed on Feb. 2, 2022, now Pat. No. 11,894,154.

(51) Int. Cl.
G21C 19/46 (2006.01)
G21F 9/00 (2006.01)
G21F 9/30 (2006.01)

(52) U.S. Cl.
CPC ............. *G21C 19/46* (2013.01); *G21F 9/007* (2013.01); *G21F 9/308* (2013.01)

(58) Field of Classification Search
CPC .... G21C 19/42–44; G21C 19/48; G21F 9/007
See application file for complete search history.

(56) References Cited

U.S. PATENT DOCUMENTS 5,389,123 A 2/1995 Bronson
8,734,738 B1 5/2014 Herrmann
(Continued)

FOREIGN PATENT DOCUMENTS

EP 4060681 A1 * 9/2022 ........... C01G 43/025
JP 3519557 4/2004
(Continued)

*Primary Examiner* — Hosung Chung
(74) *Attorney, Agent, or Firm* — Weiss & Moy, PC; Jeffrey D. Moy

(57) ABSTRACT

A single integrated system for recycling used nuclear fuel (UNF) emerging from a reactor has a decladding vessel separating fuel pellets from nuclear fuel rods via oxidation to produce $U_3O_8$. A fluorination vessel is coupled to the decladding vessel to remove hexafluorides from the $U_3O_8$ produced by the decladding vessel. An electrowinning vessel is coupled to the fluorination vessel removing plutonium and actinides via electrowinning.

18 Claims, 7 Drawing Sheets

(56) References Cited

U.S. PATENT DOCUMENTS

2016/0045847 A1     2/2016   Kuennen
2020/0118698 A1     4/2020   Cheatham, III et al.

FOREIGN PATENT DOCUMENTS

| JP | 05188186 | 4/2007 |
| KR | 102182475 | 11/2020 |
| WO | 2004036595 | 4/2004 |

* cited by examiner

MODULAR, INTEGRATED, AUTOMATED, COMPACT, AND PROLIFERATION-HARDENED METHOD TO CHEMICALLY RECYCLE USED NUCLEAR FUEL (UNF) ORIGINATING FROM NUCLEAR REACTORS TO RECOVER A MIXTURE OF TRANSURANIC (TRU) ELEMENTS FOR ADVANCED REACTOR FUEL TO RECYCLE URANIUM AND ZIRCONIUM

TECHNICAL FIELD

The present application generally relates to nuclear reactors, and more specifically, to a method for recycling uranium, plutonium, and possibly minor actinides from used nuclear fuel (UNF) in order to dispose of only the actual waste byproducts of the nuclear fission process, namely fission products.

BACKGROUND

Almost all commercial thermal-neutron reactors are light-water reactors (LWR). LWRs are a type of thermal-neutron reactor that uses demineralized water as both the coolant and neutron moderator as opposed to heavy-water reactors which are also a thermal-neutron reactor but use a foam of water that contains deuterium ($^2$H). In an LWR, fast neutrons emerging from fission collide with the hydrogen atoms in water and slow down. This increases the neutron's probability of interacting with the fuel atoms. LWRs use ceramic pellets made of 3-5% enriched uranium-oxide as fuel. These pellets are loaded onto thin-walled cylinders of zircaloy cladding to prevent radioactive fission products (FP) from being released into the coolant water. The zircaloy is highly corrosion resistant and has a low neutron interaction cross-section. The cylindrical tubes are sealed with an inert atmosphere of helium gas to prevent chemical reactions and to increase heat transfer. These "fuel rods" may be arranged into assemblies, typically 17×17 for a pressurized water reactor (PWR) and 10×10 for a boiling water reactor (BWR). The assemblies themselves may be made from stainless steel and provide structural support using end plates, axially distributed grid spacers, expansion springs, and guide tubes for control rods and instrumentation.

As fuel atoms fission and are consumed, the ability of the fuel pellets to sustain a chain reaction is diminished. Over time, FPs accumulate and increase parasitic neutron losses. Furthermore, physical damage sustained by the fuel due to heat and radiation also limits its lifetime. Every 18 to 24 months, one-third of the fuel assemblies may be removed from the reactor core and replaced with fresh ones. The rest of the fuel assemblies may be shuffled to ensure consistent fuel burn-up. Thus, the average time a fuel assembly spends in the core is between 4.5 to 6 years. When removed from the core, the used nuclear fuel (UNF) produces intense heat and radiation from short-lived FPs which make cooling and radiation shielding necessary. Hence, the used fuel assemblies may be stored on-site in pools of demineralized water. After spending about 10 years in this wet storage, the UNF is packaged into dry casks made of steel and reinforced concrete and stored on concrete pads on the plant sites. These casks can later be moved to a geologic repository when one becomes available. This UNF is what is commonly referred to as "nuclear waste."

The UNF is not completely spent of fuel. The vast majority of UNF (>95%) is composed of U-238 with ~0.9% unburnt U-235. During its time in the neutron field of the reactor core, some of the U-238 atoms capture neutrons and turns into heavier than uranium isotopes called "transuranics" or TRU. Therefore, approximately 1.0% of UNF may be composed of TRU where 0.9% may be unburnt plutonium formed from neutron captures in U-238, and ~0.1% minor actinides formed from successive neutron captures such as neptunium, americium, curium etc. The rest is a mixture of FPs much of which have already become radioactively stable.

The radioactive makeup of UNF may be as follows: ~1% short-lived (half-life of 1 to <50 years) FPs, ~1% medium-lived (1000 to <100 k years) TRU, and 95.5% very-long-lived (>100M years) uranium. Fission products may be of greatest concern to the environment in the short term and generally require isolation for a few hundred years. Transuranics have half-lives of several thousand years and generally require geologic isolation for up to 250 k years. They are of greatest concern when analyzing means of UNF disposal. However, they could potentially serve as fuel if recovered. The uranium in the UNF is harmless from a radioactive standpoint since its isotopes have half-lives ranging from 2 million to 4 billion years. Each category on its own is quite manageable, but since they are mixed up in UNF, they present a radiological health risk and require expensive monitoring and politically challenging disposal.

Reprocessing generally means to effectively "close" the fuel cycle by recycling uranium, plutonium, and possibly minor actinides and dispose only of the actual waste byproducts of the nuclear fission process, namely fission products. Current commercial reprocessing methodologies are based on the Plutonium and Uranium Recovery by Extraction (PUREX) process or its derivatives (https://link.springer-.com/chapter/10.1007%2F1-4020-3598-5_24). PUREX is an aqueous process meaning it requires dissolution of the UNF pellets in solutions of various acids of differing strengths. Water being an excellent neutron moderator limits the size of the equipment due to nuclear criticality concerns which makes larger facilities necessary for sufficient throughput. Use of such acids and reagents also leads to the production of large quantities of mildly radioactive chemical waste due to radiolysis. Furthermore, PUREX leads to the production of a purified plutonium stream creating proliferation concerns and, as such, derivatives of PUREX are aimed at minimizing the proliferation risks by either co-extracting minor actinides or by denaturing the product. An alternative approach called pyroprocessing has also been developed but not industrially deployed (please see https://www.sciencedirect.com/science/article/abs/pii/0149197096000078 and https://www.sciencedirect.com/science/article/pii/B9780128197257002208). Pyroprocessing is generally a batch process with solids being transferred from one unit operation to another.

Therefore, it would be desirable to provide a system and method that overcomes the limitations of the above. The system and method will use an improved process that integrates the various unit operations in a series of connected vessels to accomplish the task of recycling nuclear waste. The system and method will use chemistry which is derivative of pyroprocessing, fluorination, and electrowinning with the process flow making important improvements over existing methods for recycling UNF.

SUMMARY

In accordance with one embodiment, a single integrated system for recycling used nuclear fuel (UNF) emerging from a reactor is disclosed. The system can also accommodate metal and molten salt-based fuels, although the embodiment described uses a uranium oxide-based fuel with zircaloy cladding emerging from reactors. The system has a decladding vessel to separate fuel pellets from nuclear fuel rods in the form of $U_3O_8$. A fluorination vessel is coupled to the decladding vessel to remove hexafluorides from the $U_3O_8$ produced by the decladding vessel. An electrowinning vessel is coupled to the fluorination vessel to remove plutonium and minor actinides via electrowinning.

In accordance with one embodiment, a method of recycling used nuclear fuel (UNF) emerging from a reactor is disclosed. The method comprising: separating fuel pellets from nuclear fuel rods by oxidizing $UO_2$ of the fuel pellets under a dry oxygen atmosphere at under atmospheric pressure and between 400-500° C. into $U_3O_8$; removing volatile hexafluorides from the $U_3O_8$ by contacting it with a fluorinating agent in a molten salt environment; and removing dissolved plutonium and minor actinides remaining in the molten salt medium via electrowinning.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

Figure 1:
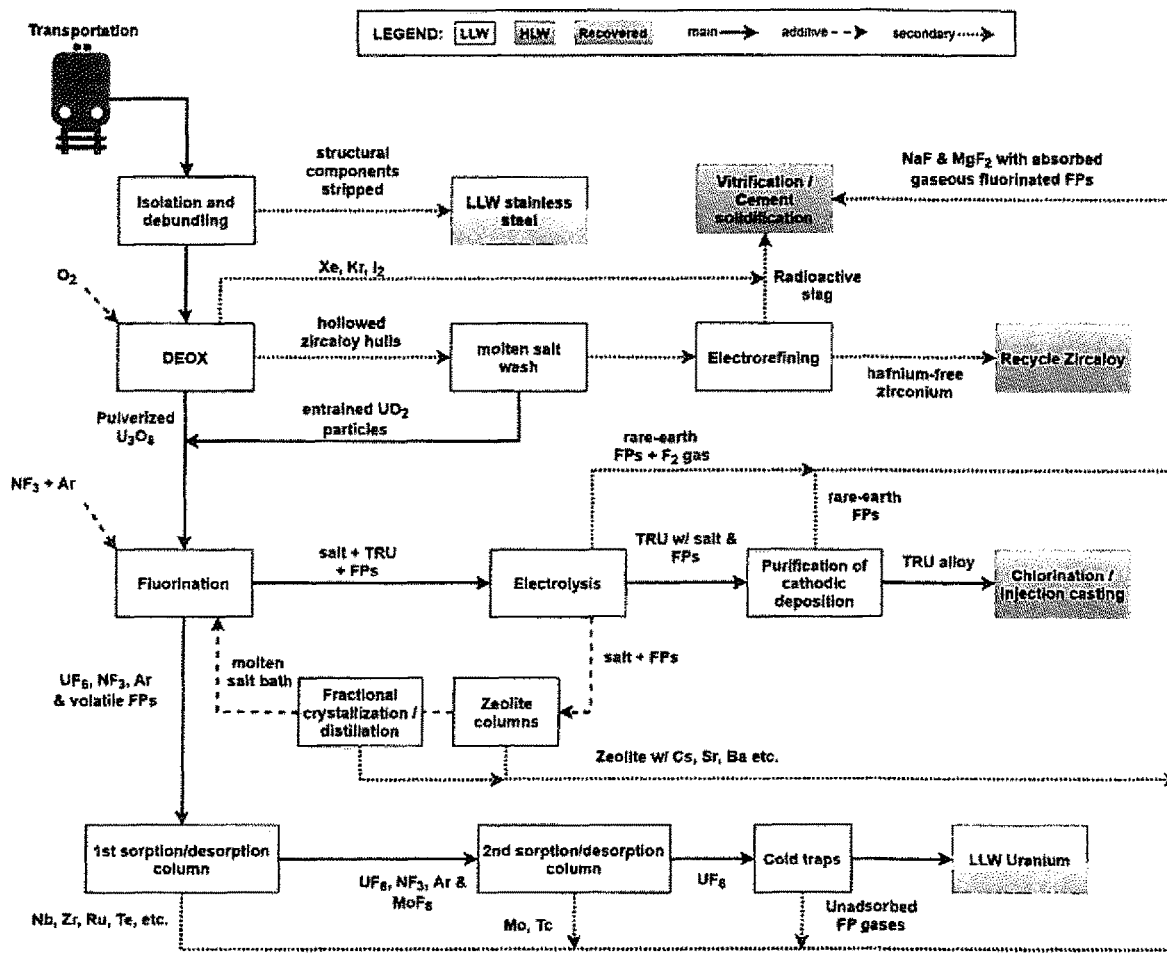
FIG. 1 is a flow chart of an exemplary embodiment of a method to recycle used nuclear fuel from light water reactors in accordance with an embodiment of the present invention.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Pyroprocessing may be defined as a process in which materials are subjected to high temperatures (typically over 800° C.) in order to bring about a chemical or physical change. Nuclear pyroprocessing may be defined as a high-temperature electrochemical fuel processing technology for recycling the spent fuel into metal fuel for a nuclear fast reactor. Nuclear pyroprocessing makes use of electrorefining to separate out uranium, plutonium+TRUs, and FPs by employing a suitable electrolyte solution (e.g., molten LiCl—KCl eutectic). The corrosive salts and the high temperatures result in great stress on the containment materials. The high radiation fields encountered due to the shorter cooling time prior to reprocessing makes the use of sensors and probes for continuous monitoring more difficult. The process lends itself better to metallic fuels, hence its use in the IFR project, but it has been tested with oxide fuels (https://www.sciencedirect.com/science/article/pii/S1002007115001197) by reducing the fuel to metallic form prior to processing. While originally studied as a batch process, recent studies have experimented with continuous operation by removing FPs from the electrolyte solution by passing it through zeolite columns (https://www.sciencedirect.com/science/article/pii/B9781845695019500104).

Embodiments of the exemplary system and method disclose an improved process that integrates the various unit operations in a series of connected vessels to accomplish the task of recycling nuclear waste. The chemistry is derivative of pyroprocessing, fluorination, and electrowinning and the process flow makes important improvements over existing methods for recycling UNF.

Embodiments of the exemplary system and method are aimed at optimizing the recycling of UNF emerging from LWRs, although the applicability can be extended to metallic, molten salt, and other fuel forms. The unit operations are adaptations/modifications of chemical processes that have been under development. In the described process, the primary unit operations of the recycling chemistry are conducted in a fused halide salt medium. The chemistry consists mostly of redox reactions that are propagated by use of reagents or by the application of an appropriate electric potential. The bulk component of the UNF—the uranium—may be removed in a single step by conversion into a gas which allows for improved separation factors. The fused salt after uranium removal contains TRU fluorides along with short-lived fission products that form stable fluorides which is distinct from PUREX where the fission product stream is separated out in the first steps. An electrowinning process uses an electric potential to drive the deposition of actinide fluorides (only TRU at this stage) present in the fused salt phase as a metal on a suitable cathode. This is followed by an increase in the electric potential to deposit lanthanide species on a separate cathode. Reactive fission product species continue to remain in the fused salt and can be separated through a combination of ion exchange, fractional crystallization, and distillation.

Referring to the Figures, a system 1 and method aimed at optimizing the recycling of UNF emerging from LWRs may be disclosed. The system 1 may integrate various suboperations into a continuous process which enables transfer of the nuclear material from one operation to another with minimal operator intervention. As may be seen, the initial step in this process is to efficiently separate the fuel pellets from the zircaloy cladding. Oxide fuel is not the most efficient conductor of heat. At full power operation, the temperature at the center of the pellet is upwards of 1200° C. while the outer surface of the pellet is close to 400° C., while the temperature at the surface of the cladding is around 300° C. Moreover, FP gases may accumulate during operation leading to swelling and cracking of the cladding. When there is significant swelling the pellet surface presses against the inner walls of the cladding and can physically bind with it or sometimes even fracture the cladding. These phenomena are collectively known as pellet-cladding interaction. Hence, "decladding" may be a necessary head-end step. Decladding may take a variety of different forms.

In accordance with one embodiment, the decladding method oxidizes $UO_2$ under a dry oxygen atmosphere at slightly under atmospheric pressure and at a temperature in the range between ~400-500° C. into $U_3O_8$ as may be seen in the equation below. Upon reaction with the oxygen, the uranium oxide pulverizes into a powder of tri-uranium octoxide, the volume of the pellets increases which offers efficient separation from the cladding. The general process is as follows:

$$UO_2 \xrightarrow{O_2 @ 80 \text{ kPa}, 400\text{-}500° \text{ C.}} U_3O_8$$

When recycling metallic fuel, a head end process separates the cladding, if present, from the metal including any reactive bonding material (e.g., sodium) and then subject the metallic fuel to the above oxidation reaction to produce pulverized $U_3O_8$. The remaining operations do not change in the case of metallic fuel.

The pulverized fuel has been observed to have a minimum and a maximum particle size such that contamination from fine powder residues is minimal. At these high temperatures, gaseous and other volatile fission products such as krypton, xenon, iodine, bromine, tritium, and the decay product radon that have accumulated at grain boundaries may be released. Studies show that punching holes in the cladding prior to oxidation may increase the rate of the reaction. With hole punching and shearing, volatile FPs in the fuel rod plenum (i.e., space in the clad rods for gas accumulation) may be released. Therefore, it is envisioned that both these unit operations may be conducted in a single space, regardless of the number of parallel units of the subsequent operations, which would minimize gas volume requiring purification.

Figure 2A:
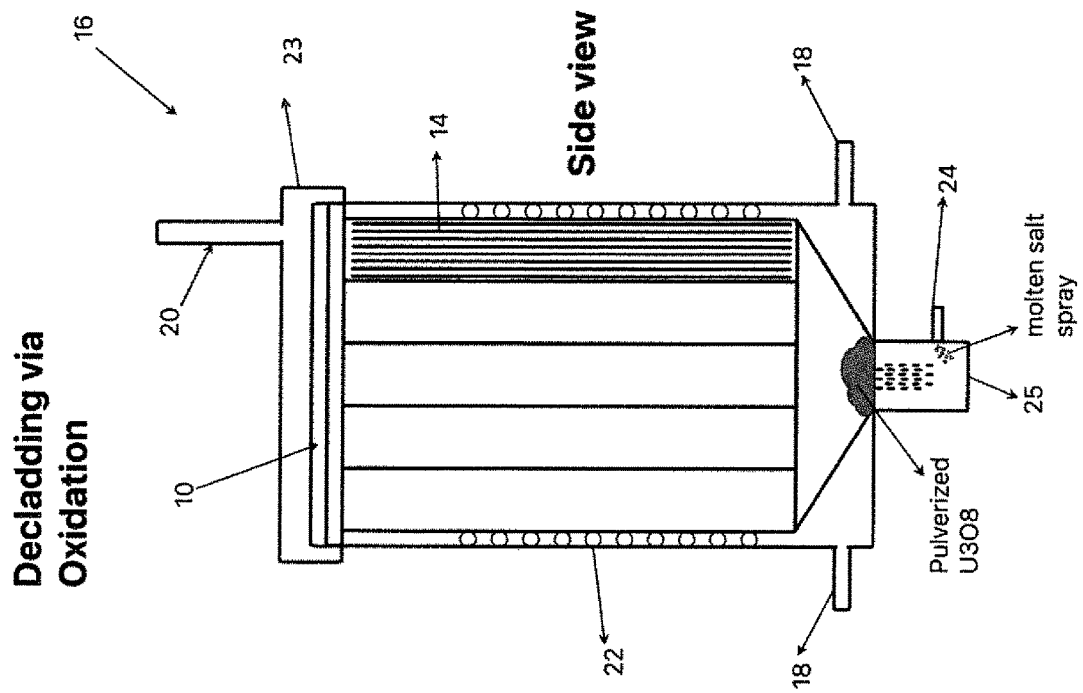
FIGS. 2A-2B are exemplary embodiments of a decladding vessel used in the method shown in FIG. 1 in accordance with an embodiment of the present invention.
Figure 2B:
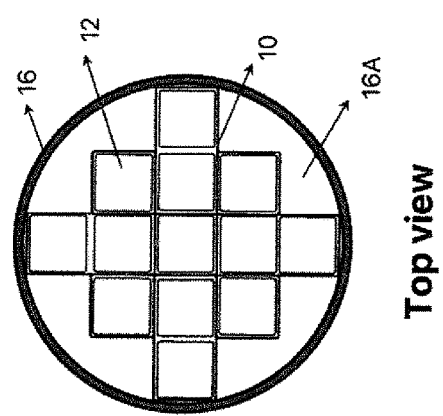

In the process employed here, after some physical debundling i.e., removal of structural components, and hole punching to allow for efficient reaction, the UNF assemblies may be loaded into a removable basket mechanism 10 (hereinafter mechanism 10) as may be seen in FIG. 2A-2B. The removable basket mechanism 10 may have a plurality of slots 12 formed within the interior of the mechanism 10. Each slot 12 may be of the appropriate size (17×17 or 10×10) for securing fuel rods 14 in an upright manner. The vessel 16 may be provided with a removable enclosure 23 attached to a top area of the vessel 16. The removable enclosure 23 may be used to provide isolation of the inner atmosphere and may include an outlet 20 to circulate the atmosphere and collect any off gas from the process.

The mechanism 10, loaded with the spent fuel rods 14, may then be positioned within an interior of a decladding vessel 16 (hereinafter vessel 16). The vessel 16 may be composed of metal alloys capable of withstanding high temperatures without corrosion such as various stainless steels, inconels, and the like. The vessel 16 may be formed of a sufficient thickness to withstand the desired temperatures/pressures used during the decladding process.

The interior of the vessel 16 may be formed of a heat-resistant ceramic material 16A. In accordance with one embodiment, the heat-resistant ceramic material 16A may be capable of withstanding oxidation at temperatures up to ~1500° C. In accordance with one embodiment, the same ceramic material may be used to coat the mechanism 10 and the surfaces of the slots 12 formed in the mechanism 10.

Inlets 18 and outlets 20 may be formed in the vessel 16 and in communication with the interior of the vessel 16. The inlets 18 and outlets 20 may be formed to allow oxygen to enter into the vessel 16 and for various fission product gases to exit the vessel 16. Heaters 22 may be coupled to the vessel 16. The heaters 22 may be used to maintain the temperature of the vessel 16.

With the fuel rods 14 placed within the interior of the vessel 16, the vessel may be heated between 400 to over 500° C. in a dry, excess oxygen atmosphere to convert the uranium oxide into $U_3O_8$. The reaction with oxygen pulverizes the pellets into $U_3O_8$ powder and the vessel 16 may collect this powder in the bottom of the vessel 16. The reaction may also simultaneously rupture the cladding of the fuel rods 14.

The pulverized $U_3O_8$ powder formed during the decladding process may be collected at the bottom of the vessel 16 for further processing while the hollowed zircaloy cladding of the fuel rods 14 can be retrieved and refined through electrotransport whereby high-purity hafnium-free zirconium may be recovered.

In accordance with one embodiment, the vessel 16 may serve a dual purpose wherein the vessel 16 may be used for the retrieval of zirconium post oxidation. Following the decladding process, the zircaloy cladding hulls of the fuel rods 14 may be left behind. A molten salt with poor solubility for uranium oxides may be introduced into the vessel 16 with the mechanism 10 containing the fuel rods 14 and positioned between cathode—and anode+plates. A small quantity of zirconium halide may be added to the salt to initiate the electrotransport. Upon application of a suitable electric potential to the cathode—and anode+plates, the zirconium from the fuel rods 14 is electrotransported/electrorefined through dissolution into the molten salt while zirconium halide reduces into a metal and dissolves into a liquid cadmium cathode. The process lets loose bits of $U_3O_8$ that may collect in the vessel 16 and can be transferred into the downstream process. It should be noted that the above steps could be changed where the vessel 16 is filled with the molten salt first, followed by the decladding process.

The following reactions may occur:

Anode: $Zr \rightarrow Zr^{n+} + ne^-$

Cathode: $Zr^{n+} + ne^- = Zr$

The cadmium cathode carrying its burden of zirconium may be drained out at the bottom of the vessel 16 via an outlet 25. Any salt making its way out can easily be separated out. Meanwhile, upon cooling, the zirconium may be separated from the cadmium via phase separation through fractional crystallization.

In accordance with another embodiment, the decladding may be done by electrotransport of the zirconium after which the uranium oxide pellets may be collected in the bottom of the vessel 16 and then after draining of the molten salt the $UO_2$ may be roasted in a dry oxygen atmosphere to form $U_3O_8$ powder.

Figure 3:
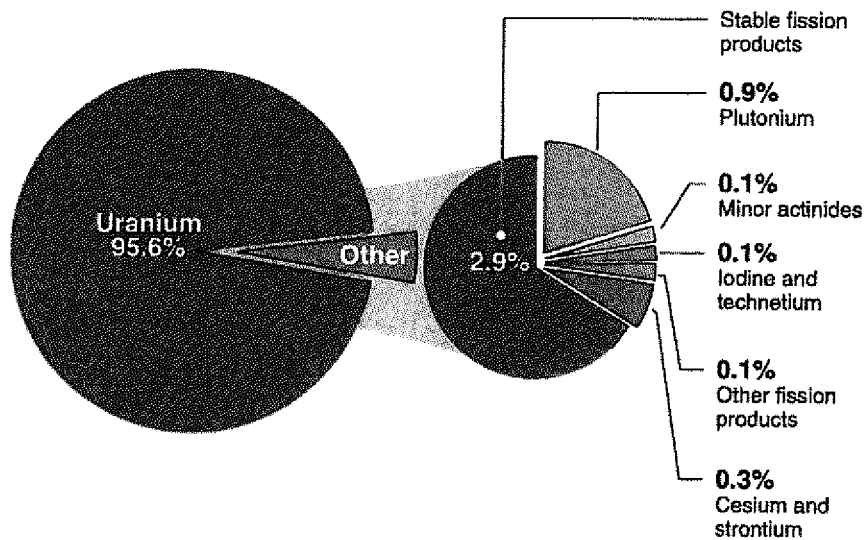
FIG. 3 is an exemplary diagram showing a chemical composition of used nuclear fuel in accordance with an embodiment of the present invention.

UNF has a nominal composition as may be shown in FIG. 3. In conventional pyroprocessing, the uranium oxide may be reduced to a metal prior to an electrorefining process to recover and separate the uranium and plutonium. However, it suffers from poor separation factors for the uranium while also requiring transfer of material between vessels. In accordance with one embodiment, instead of reduction of the oxide into a metal, the pulverized $U_3O_8$ may be converted into a slurry. A suitable molten salt spray may be injected directly into the vessel 16 via an input 24.

Figure 4:
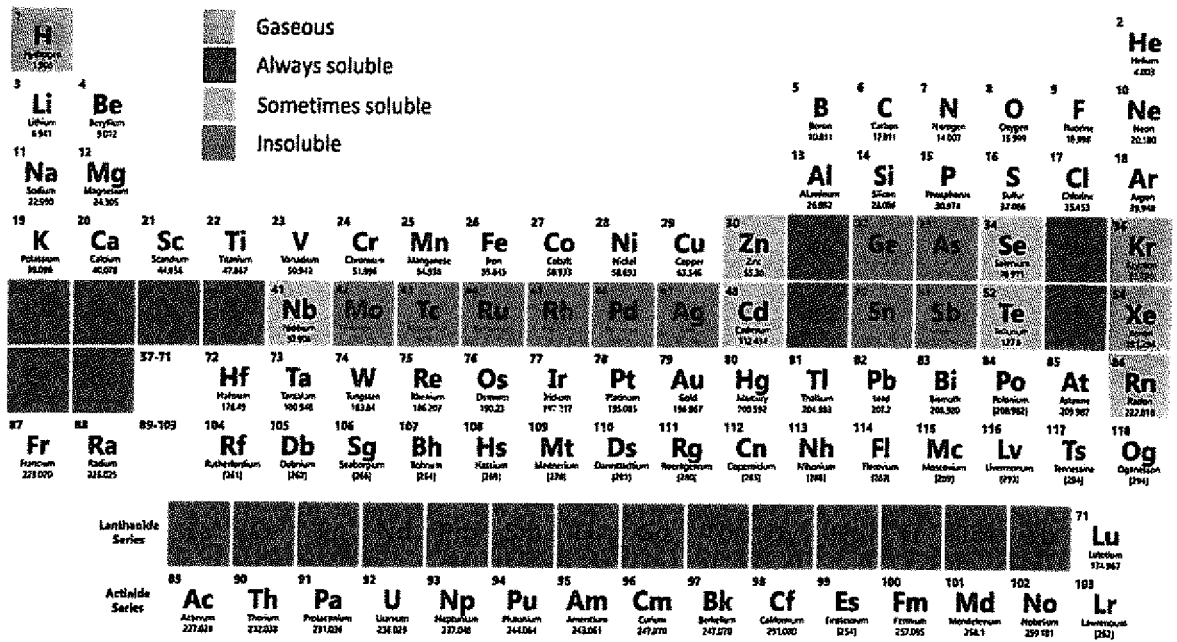
FIG. 4 is an exemplary chart showing generalized behavior of fission products in fluoride salts in accordance with an embodiment of the present invention.

For process efficiency, the uranium is to be recovered with minimal contamination. Several systems propose using the valence chemistry of uranium to collect it as volatile $UF_6$. This can be achieved by contacting a gaseous or liquid fluorinating agent. Many prominent fission products form fluorides (as shown in FIG. 4) and are dissolved into the molten salt in the process.

For separations of nuclear materials from UNF, the volatile hexafluorides of U, Pu, and Np can be removed from a complex matrix such as the pulverized $U_3O_8$ matrix containing FPs and TRUs as present in this proposed process flow. Efficient separation of the obtained volatile fluorides from each other can be achieved by their volatility by altering conditions with respect to their physical properties such as boiling and sublimation points. Several potent fluorinating agents have been investigated for these purposes —HF, $F_2$, $ClF_3$, $BrF_5$, etc. Since large-scale fluorination in such a facility would depend on storage, handling, and transportation of such fluorinating agents, there exists a significant risk to human health and the environment. Being that such agents are corrosive, their accidental release in a UNF recycling facility will add to the complication of design basis accident prevention requirements.

Alternatively, nitrogen trifluoride ($NF_3$) may serve as an efficient fluorinating agent. $NF_3$ has been used in the electronic industry to remove silicon and silicon-compounds during the manufacturing of semiconductor devices and in cleaning of microelectronic devices. Unlike the fluorinating agents described above, $NF_3$ is not corrosive and does not react significantly with moisture, or common acids and bases at room temperature. $NF_3$ is also thermally stable to relatively high temperatures and insensitive to shock so that it could be transported, stored, and handled, safely and economically for a large-scale process.

The Gibbs free energy of principal reactions of uranium metal, and various uranium and plutonium compounds with $NF_3$ is presented below. The reactions are at 300° C., however, there should be little variation at the envisioned temperatures for the project (~800° C.).

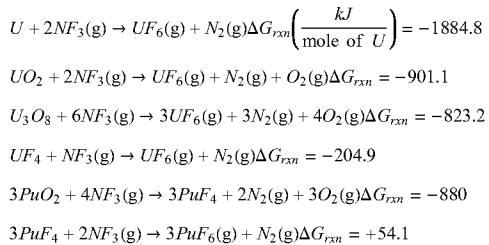

The free energies clearly show that reaction with metal is most favorable, however, such a reaction may sometimes proceed with the formation of a $UF_4$ intermediate. Reaction with tri-uranium octoxide will also proceed spontaneously but may lead to the formation of intermediate oxyfluorides. The bulk reaction will be sensitive to temperature and other factors such as how well the reactants are mixed that will require optimization. Similarly, note that while $NF_3$ will convert $PuO_2$ into $PuF_4$, the formation of a hexafluoride is not favorable.

Figure 6:
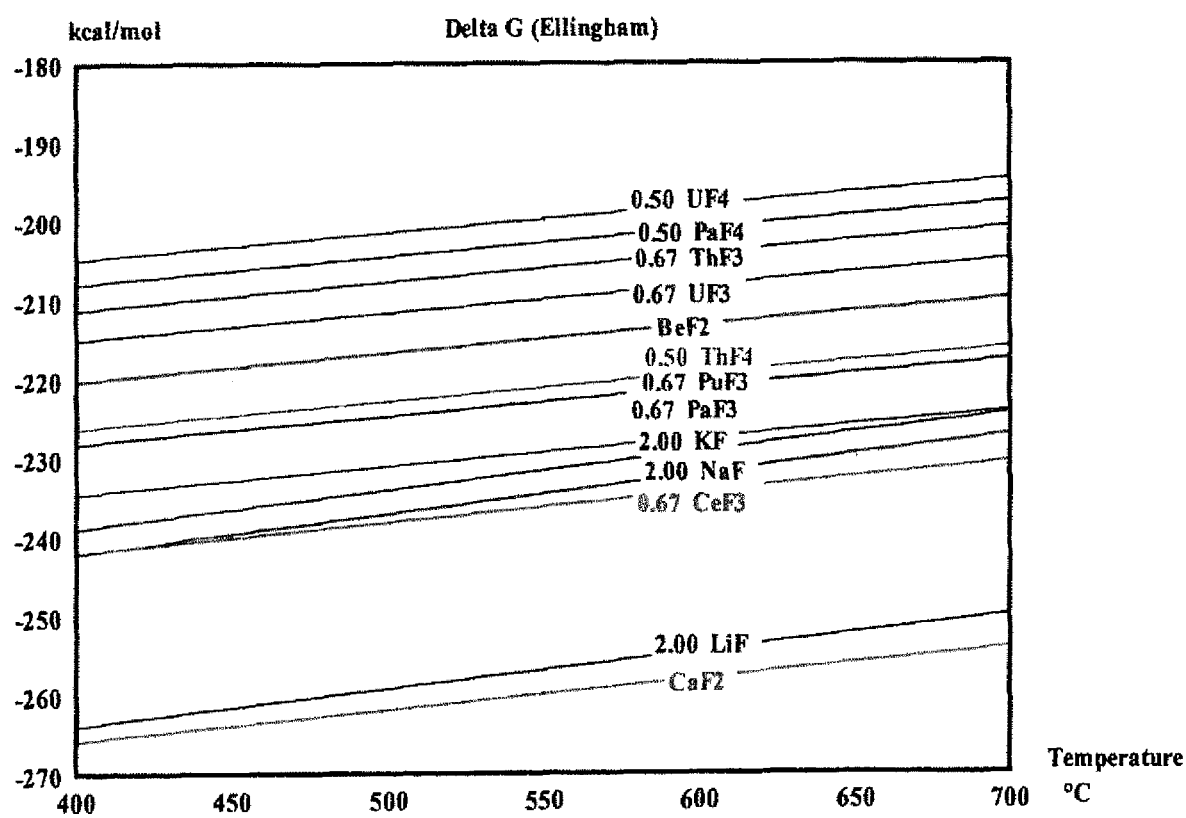
FIG. 6 is an exemplary diagram showing the relative "stability" of different salt components that may be used for nuclear fuel recycling in accordance with an embodiment of the present invention.

FIG. 6 may show a diagram for various fluorides of interest in UNF recycling. The eutectic mixture of LiF—$CaF_2$ may serve as a very stable mixture with an acceptable eutectic melting point of 767° C. Dissolution of uranium and other actinide fluorides may serve to further reduce the eutectic point. Alternatively, LiF—NaF or LiF—KF that have lower eutectic points could also be used depending on the engineering needs.

As $NF_3$ gas mixed with an inert medium such as helium or argon is bubbled through the pulverized UNF mixture, the tri-uranium octoxide readily forms $UF_6$ which bubbles out of solution. As discussed, unlike $F_2$ gas, $NF_3$ is not an effective agent to produce $PuF_6$ and maintain the volatility. The reaction is unfavorable and any $PuF_6$ formed is readily reduced to $PuF_4$ with $UF_4$ in the salt acting as the reducing agent. Neptunium, which exists in UNF mainly as Np-237, may partially volatilize in this process. In purification of the gas stream, the Np-237 can be collected, which is feed material for production of valuable Pu-238 used in powering deep space satellites and rovers.

The emanating gases will require treatment to separate out uranium from other volatilized FP-fluorides. This separation can be achieved through selective adsorption and desorption of the minor gas components by passing it over beds of NaF, $MgF_2$, or alumina. $NpF_6$ can be absorbed by beds of MgO. One process developed in the past utilized a bed of NaF pellets at 400° C. which irreversibly captures Nb, Ru, and Zr fluorides from the gas stream. The second sorption bed is NaF at 100° C. which captures U and Mo fluorides, albeit reversibly. The remaining volatile FPs continue to pass through and are captured as waste. When the second fluoride bed is heated to >150° C., the U and Mo fluorides desorb and can be passed over a third bed of $MgF_2$ at 150° C. which captures $MoF_6$ and thus a purified stream of $UF_6$ may be obtained.

If a fluoride molten salt fuel form is the feed to the process, it is introduced into the process at this stage and subjected to the fluorination operation. The free energy of formation of $UF_6$ from $UF_4$ means that the process is still sufficiently favorable. The remaining operations are the same as other fuel types.

By removing the uranium first, the concentrated fission products and minor actinides make the plutonium proliferation barriered. The uranium thus recovered could be used as feed for enrichment, converted into breeding material for fast-spectrum reactors, reconstituted with the recovered TRU mixture for fueling advanced reactors, or simply returned to the Earth in the form of an oxide.

Volatilization of uranium allows for very good separation factors (>$10^5$) between the uranium and fission product contaminants. It allows for the partial recovery of neptunium in UNF (which is composed almost entirely of Np-237) that can be cryo-distilled from the stream. Np-237 is feed material in high flux reactors to produce Pu-238 that is used in radioisotope thermoelectric generators (RTGs) for deep space probes.

Figure 5:
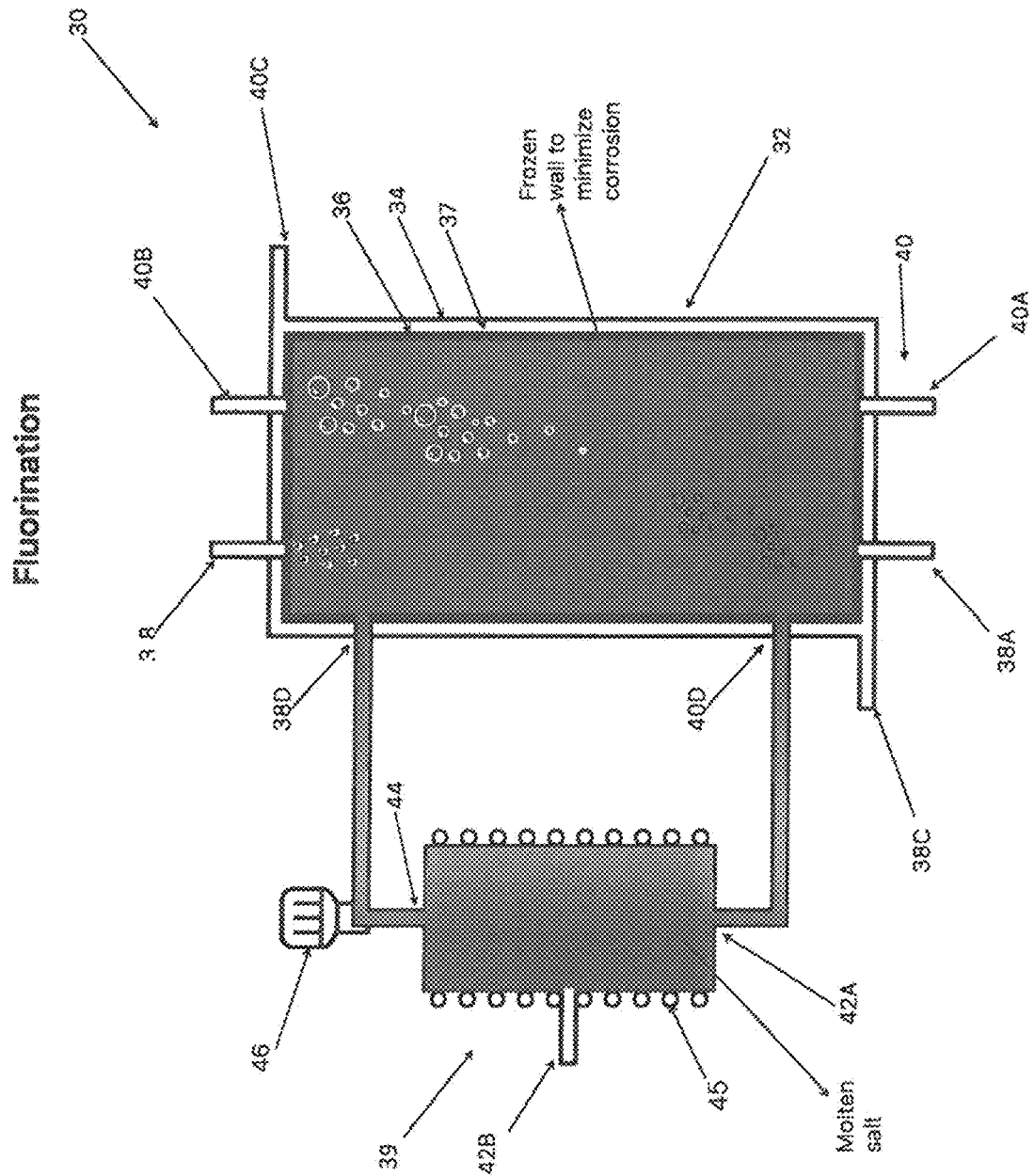
FIG. 5 is exemplary embodiment of a fluorination vessel use in the method shown in FIG. 1 in accordance with an embodiment of the present invention.

Referring to FIG. 5, a vessel 30 for the fluorination of $U_3O_8$ may be shown. The vessel 30 may be formed of a first tank 32. The first tank may be formed from a suitable alloy that is compatible with the corrosive salt environment and whose chemical components do not participate appreciably in the redox chemistry under the operating conditions of the proposed process. Various grades of high-nickel alloys such as Inconel and alloys of nickel and chromium with refractory metals such as Monel are suitable candidates, and so are carbon composites of lanthanide boride.

The first tank 32 may feature double walls (i.e., a vessel within a vessel structure). An outer wall 34 of the first tank may serve as a catch pan in the event of leakage. The space 37 between the outer wall 34 and an inner wall 36 may be used to cool the first tank 32. In accordance with one embodiment, the space between the outer wall 34 and the inner wall 36 may be cooled either by circulating a coolant, or the outer face of the inner wall 36 may be built with a network of heat pipes that offer passive cooling. In accordance with one embodiment, a coolant like NaK alloy may be used and which could also be the coolant within the heat pipes should that design be used. This fulfills two purposes:

1) the inner face of the inner wall 36 may always maintains a layer of "frozen" salt that provides a barrier to chemical corrosion as the fluorination reactions are conducted, and
2) passive cooling is provided for the highly exothermic reactions that form volatile fluorides.

The first tank 32 may have a plurality of inlets 38. The inlets 38 may be in communication with the interior of the first tank 32. The inlets 38 may be used to insert different agents within the first tank 32 during the fluorination process. In the present embodiment shown, the first tank 32 may have a first inlet 38A, a second inlet 38B, a third inlet 38C and a fourth inlet 38D. In the present embodiment, the first inlet 38A may be formed in a bottom area of the first tank 32. The first inlet 38A may be used to insert a fluorinating agent into the first tank 32. The second inlet 38B may be formed in a top area of the first tank 32. The second inlet 38B may be used to insert the $U_3O_8$ slurry into the first tank 32. The third inlet 38C may be formed in a bottom side area of the first tank 32. The third inlet 38C may be used to circulate a coolant within the space 37 formed in first tank 32. The fourth inlet 38D may be formed in a side area of the first tank 32. The fourth inlet 38D may be used to circulate molten salt within the first tank 32.

The first tank 32 may have a plurality of outlets 40. The outlets 40 may be in communication with the interior of the first tank 32. The outlets 40 may be used to remove different material from within the first tank 32 during the fluorination process. In the present embodiment shown, the first tank 32 may have a first outlet 40A, a second outlet 40B, a third outlet 40C and a fourth outlet 40D. In the present embodiment, the first outlet 40A may be formed in a bottom area of the first tank 32. The first outlet 40A may be used to remove the molten salt inserted into the first tank 32. The second outlet 40B may be formed in a top area of the first tank 32. The second outlet 40B may be used to remove the $UF_6$ from the first tank 32. The third outlet 40C may be formed in a top side area of the first tank 32. The third outlet 40C may be used to remove the coolant circulating within the space 37 formed by the inner wall 36 and outer wall 34 in first tank 32. The fourth outlet 40D may be formed in a side area of the first tank 32. The fourth outlet 40D may be used to remove the molten salt within the first tank 32.

The vessel 30 may have a second tank 39 coupled to the first tank 32. The second tank 39 may be used to circulate molten salt through the first tank 32. The second tank 39 may have an inlet 42A formed on a bottom area of the second tank 39. The inlet 42A may be coupled to the fourth outlet 40D of the first tank 32. The second tank 39 may have an outlet 44 formed on a top area of the second tank 39. The outlet 44 may be coupled to the fourth inlet 38D of the first tank 32. Molten salt in the second tank 36 may exit the outlet 44 and flow into the fourth inlet 38D of the first tank 32. The molten salt may exit the first tank 32 via the fourth outlet 40D and return to the second tank 39 via the inlet 42A. The second tank 39 may have another inlet 42B formed on a side area thereof. The inlet 428 may be used to inject replacement salt into the second tank 39.

Heaters 45 may be coupled to the second tank 39. The heaters 45 may be used to transfer thermal energy to the second tank 39 in order to control and maintain the liquidus of the molten salt in the second tank 39 and thus the conditions in the first tank 32.

The vessel 30 may have a pump 46. The pump 46 may be coupled between the first tank 32 and the second tank 39. The pump 46 may be used to circulate the molten salt between the first tank 32 and the second tank 39.

Electrowinning is one of the oldest known electrolytic processes and is widely used in modern metal recovery, mining, refining, and even wastewater treatment. It has long been proposed as a means to extract actinides. In the presented process, plutonium and minor actinides remaining in the salt mixture post volatilization of uranium lend themselves well to being coextracted on a solid or liquid electrode via electrowinning. The extraction can be controlled by controlling the applied potential and the process is amenable to scaleup while ensuring the recovered plutonium is never pure.

Figure 7A:
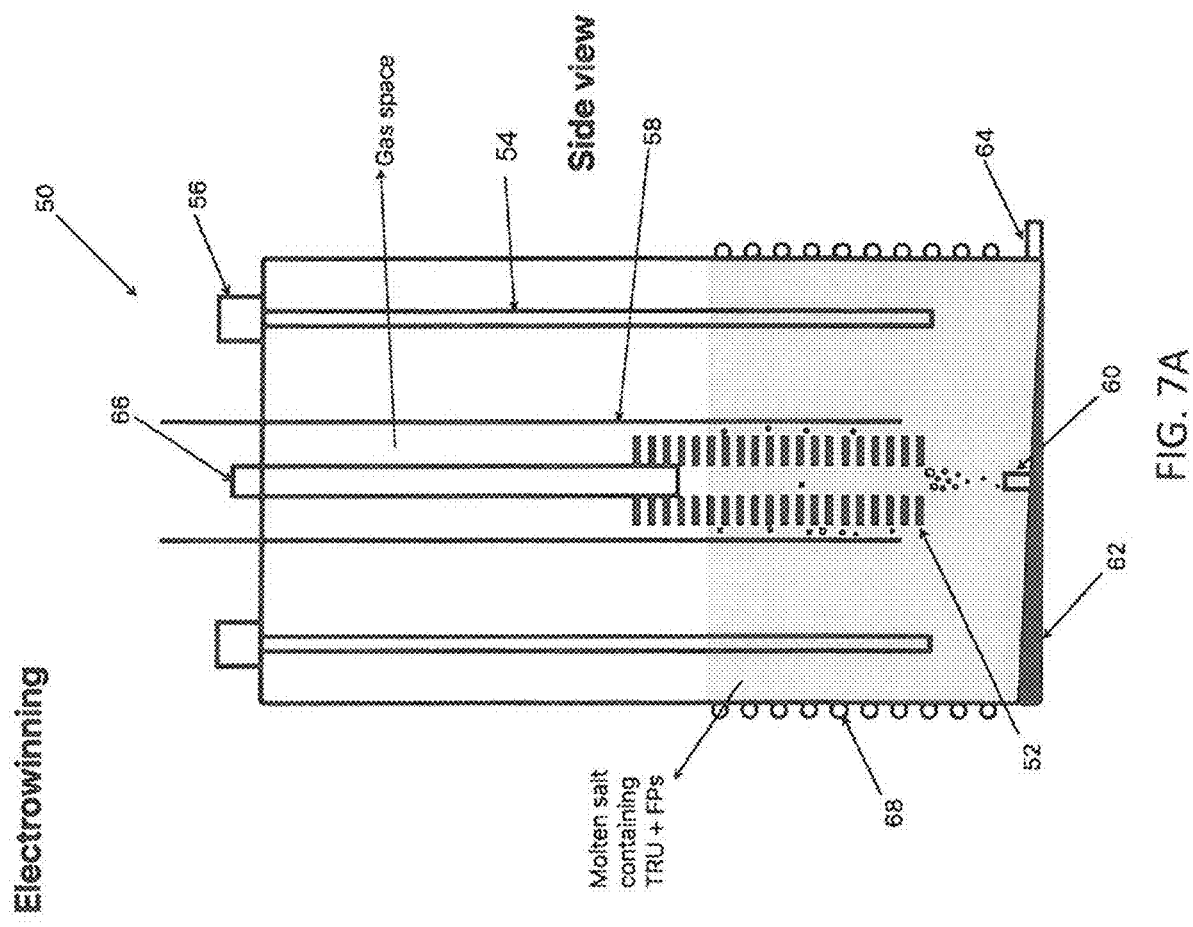
FIGS. 7A-7B are exemplary embodiments of an electrowinning vessel use in the method shown in FIG. 1 in accordance with an embodiment of the present invention.
Figure 7B:
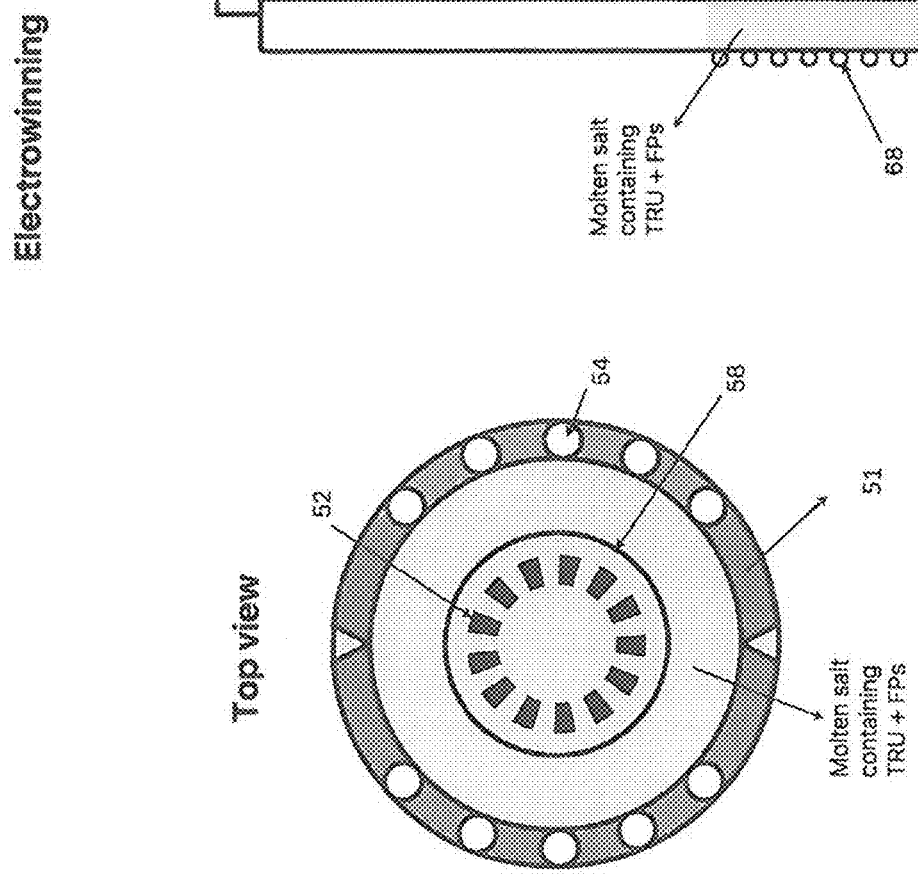

Given that a large gap exists in the reduction potential between actinides and lanthanides in a molten salt solution such as the one present here, actinides in the salt can be coextracted. As the applied electric potential between the electrodes is increased, lanthanide FP species with more negative reduction potentials can be extracted for disposal. In the proposed process, the post-fluorination molten salt mixture drains into an electrowinning vessel 50 as may be seen in FIGS. 7A-7B. The electrowinning vessel 50 may have an inlet 66 formed therein. The inlet 66 may be used to allow the molten salt mixture to drain into the electrowinning vessel 50. Heaters 68 may be coupled around the perimeter of the electrowinning vessel 50. The heaters 68 may be used to maintain the liquidus conditions of the molten salt mixture.

The electrowinning vessel 50 may consist of a central anode 52 and a plurality of cathodes 54 arranged circumferentially around the electrowinning vessel 50. The vessel 50 may consist of circular or semi-circular support rails 51 made of a conductive material such as graphite to accommodate the plurality of cathodes 54 and provide electrical conduction. The support rails 51 may be placed on the top of the vessel 50 and electrically insulated from the body of the vessel 50. In accordance with one embodiment, the anode 52 may be a porous graphite anode. The cylindrical cathodes 54 may be mounted on motors 56 that rotate the cathodes 54 to provide continuous relative motion between the molten salt and the cathode surface and ensuring that there is even deposition of the electrowon actinides. Example reactions may be as follows:

$$PuF_4 \xrightarrow{\text{electrolysis}} Pu^{4+} + 4F^-$$

$$\text{Anode: } 4F^- \rightarrow 2F_2 + 4e^-$$

$$\text{Cathode: } Pu^{4+} + 4e^- = Pu$$

A dividing shroud 58 may be positioned around the anode 52 to enable capture of the reactive fluorine gas formed on the anode 52. The dividing shroud 58 creates an isolated gas space for collection of fluorine gas formed on the porous anode 52. A noble gas atmosphere should be maintained within the electrowinning vessel 50. The electrowinning vessel 50 may have a noble gas inlet 60 formed therein. In the present embodiment, the noble gas inlet 60 may be formed in a bottom area of the electrowinning vessel 50. The noble gas inlet 60 may allow a noble gas to be continually bubbled and circulated through the mixture to provide a carrier gas that dilutes the fluorine gas fainted. The bottom floor 62 of the electrowinning vessel 50 may be slanted. The slanted bottom floor 62 may allow for the removal of insoluble FPs that may accumulate following the processing. A sludge outlet 64 may be formed on a bottom side area of the electrowinning vessel 50 adjacent to a lowest area of the slanted bottom floor 62. The sludge outlet 64 may be used to allow the sludge to be drained and removed from the electrowinning vessel 50.

The plutonium thus extracted can be considered "proliferation hardened" given the presence of other actinides (namely neptunium, americium, and curium) and contamination with fission products (>500 ppm quantities of rare earths). This stream makes it impossible to utilize the plutonium for clandestine purposes without extensive processing.

The molten-salt bath can then be passed over columns of zeolite to adsorb minor fission product impurities present to sufficiently purify the salt for reuse in the process. When sufficient quantities of reactive FPs (mainly cesium and strontium) build up in the salt, it can be subjected to fractional crystallization which would create a phase within which most of the reactive FP fluorides would be dispersed. This salt phase can then be extracted for disposal. Additionally, distillation could be employed to purify the salt mixture leaving behind the reactive FP fluoride species.

The system 1 integrates the various described suboperations into a continuous process which enables transfer of the nuclear material from one operation to another with minimal operator intervention. This allows for greatly improved material control and accounting, improved placement of instrumentation, enhanced controls, all the while reducing the quantity of material unaccounted for. The molten salt used in the system 1 is impervious to radiation damage and does not lose its chemical properties. Thus, the molten salt may be continually reused in the process.

Figure 8:
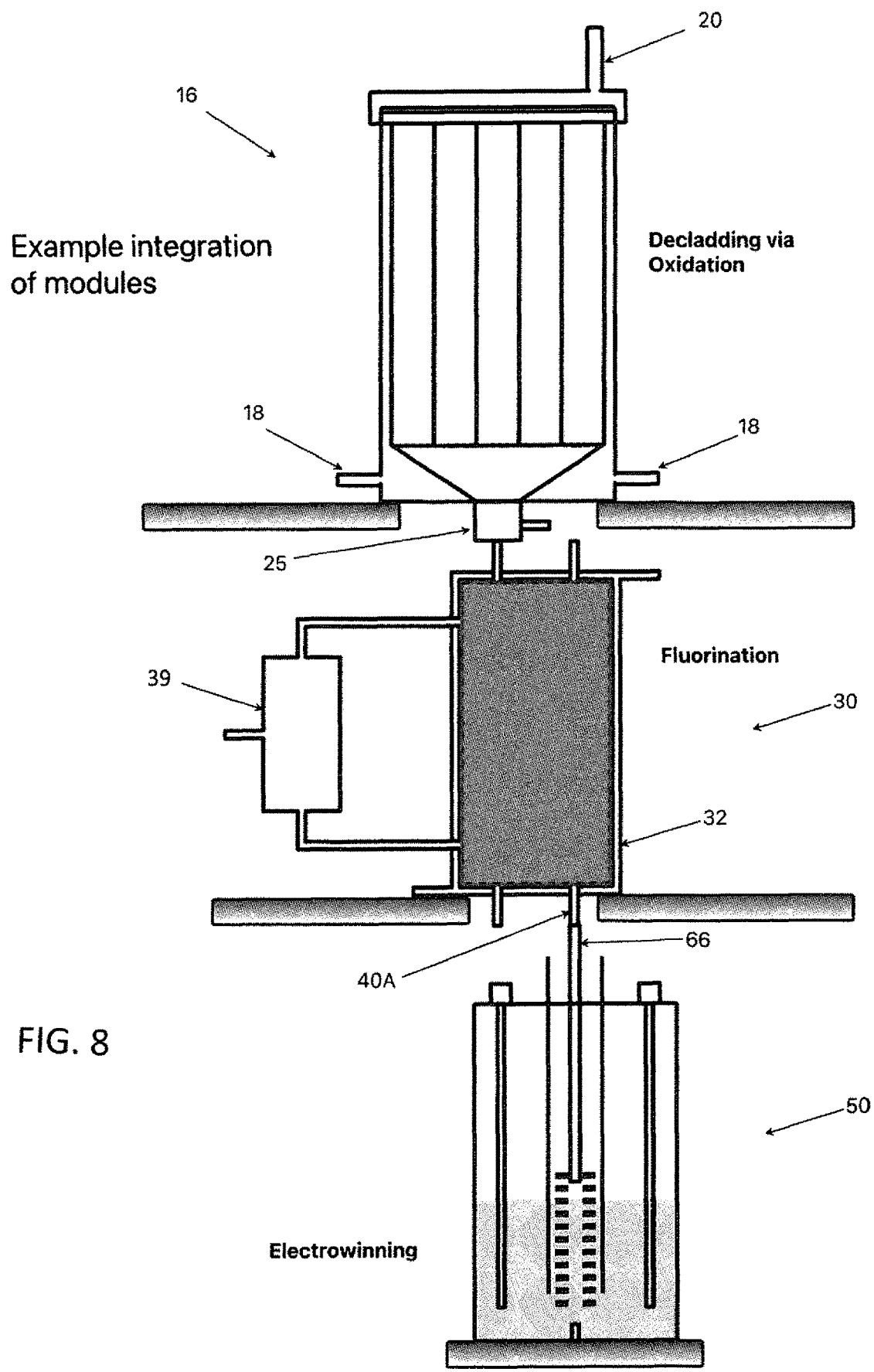
FIG. 8 is exemplary embodiment of a single integrated system to recycle used nuclear fuel from light water reactors in accordance with an embodiment of the present invention.

As may be seen in one embodiment shown in FIG. 8, the system 1 combines, scales and optimizes the decladding vessel 16, the vessel 30 for the fluorination of $U_3O_8$ and the electrowinning vessel 50 for throughput after accounting for nuclear criticality safety. Embodiments of system 1 may also utilize more than one unit of a suboperation in parallel either in combination or independently connected serially to the successive suboperation. Several such modules of the integrated systems 1 can then be built within a larger processing plant. As the processing requirements increase, more modules of the systems 1 can be added to the plant to improve economics.

The foregoing description is illustrative of particular embodiments of the application, but is not meant to be a limitation upon the practice thereof. The following claims, including all equivalents thereof, are intended to define the scope of the application.

What is claimed is:

1. A single integrated system for recycling used nuclear fuel (UNF) emerging from a reactor comprising:
    a first vessel oxidizing $UO_2$ into $U_3O_8$;
    a second vessel coupled to the first vessel removing hexafluorides from the $U_3O_8$; and
    a third vessel coupled to the second vessel removing plutonium and actinides.

2. The single integrated system of claim 1, wherein the first vessel separates unused $UO_2$ from a fuel rod.

3. The single integrated system of claim 1, wherein the first vessel oxidizes $UO_2$ into $U_3O_8$ in a dry oxygen atmosphere at a temperature of 400° C. to 500° C.

4. The single integrated system of claim 2, wherein the first vessel recovers hafnium-free zirconium from the fuel rod.

5. The single integrated system of claim 2, wherein the first vessel recovers hafnium-free zirconium from the fuel rod through electro-transport.

6. The single integrated system of claim 1, wherein the first vessel comprises:
    a removable basket mechanism having a plurality of slots formed within an interior of the first vessel, wherein each slot is sized to hold a fuel rod bundle in an upright manner; and
    a heat resistant coating applied to an interior of the first vessel and the plurality of slots;
    an inlet in communication with the interior of the first vessel, wherein an oxygen stream is injected into the first vessel, wherein the oxygen stream pulverizes the $UO_2$ by converting the $UO_2$ to $U_3O_8$, the $U_3O_8$ collecting in a bottom area of the first vessel.

7. The single integrated system of claim 6, wherein the first vessel comprises:
    a cathode; and
    anode, wherein the removable basket is the anode and positioned relative to the cathode;
    wherein when an electric charge is applied to the cathode and the anode, zirconium from the fuel rod bundle dissolving into a first molten salt solution stored within the first vessel, uranium oxide pellets collecting at a bottom of the first vessel.

8. The single integrated system of claim 1, wherein the first vessel comprises a spray input coupled to a bottom of the first vessel to inject a molten salt spray into the first vessel to form a $U_3O_8$ slurry.

9. The single integrated system of claim 1, wherein the second vessel comprises:
    double wall vessel, wherein a space is formed between the double wall for housing one of a coolant or heat pipes;
    a fluorinating agent inlet formed in the double walled vessel injecting a fluorinating agent into the double wall vessel; and
    a tank coupled to the double wall vessel for circulating a second molten salt solution into the double wall vessel.

10. The single integrated system of claim 9, wherein the fluorination vessel comprises heaters coupled to the tank.

11. The single integrated system of claim 9, wherein the fluorination vessel comprises a pump coupled to the double wall vessel and the tank.

12. The single integrated system of claim 9, wherein the fluorination agent is $F_2$, or HF, or $ClF_3$, or $BrF_5$, or $NF_3$ gas mixed with an inert gas.

13. The system of claim 9, wherein the fluorination agent is a $NF_3$ gas mixed with helium or argon, wherein neptunium, comprising of Np-237, is volatilized and collected.

14. The single integrated system of claim 1, wherein the third vessel is an electrowinning vessel.

15. The single integrated system of claim 1, wherein the electrowinning vessel comprises:
    an inlet formed in a top of the electrowinning vessel allowing the second molten salt solution to drain into the electrowinning vessel;

heaters coupled around the perimeter of the electrowinning vessel;

an anode placed in a central interior of the electrowinning vessel;

a plurality of cathodes arranged circumferentially around the electrowinning vessel;

a circular or semi-circular conductive support rails accommodating the plurality of cathodes;

a shroud positioned around the anode forming an isolated gas space to enable capture of fluorine gas formed on the anode; and a noble gas inlet formed in the electrowinning vessel to inject a noble gas into the interior of the electrowinning vessel providing a carrier gas that dilutes the fluorine gas formed.

16. The system of claim 15, wherein the electrowinning vessel comprises at least one motor coupled to the plurality of cathodes rotating the plurality of cathodes.

17. A single integrated system for recycling used nuclear fuel (UNF) emerging from a reactor comprising:

a first vessel oxidizing unused $UO_2$ from nuclear fuel rods into $U_3O_8$;

a second vessel coupled to the first vessel removing hexafluorides from the $U_3O_8$; and a third vessel coupled to the second vessel removing plutonium and actinides via electrowinning.

18. The single integrated system of claim 17, wherein the first vessel recovers hafnium-free zirconium from the fuel rod through electro-transport.

* * * * *